Figure 1:
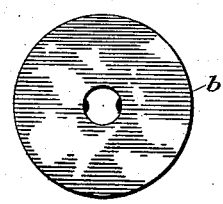

(No Model.)

T. GUILFORD.
MANUFACTURE OF ARTICLES FROM PLASTIC MATERIALS.

No. 256,476. Patented Apr. 18, 1882.

WITNESSES:
E. B. Bolton
Geo. Bainton

INVENTOR:
Timothy Guilford
By his Attorneys,
Burke, Fraser & Connett

UNITED STATES PATENT OFFICE.

TIMOTHY GUILFORD, OF NEW YORK, N. Y.

MANUFACTURE OF ARTICLES FROM PLASTIC MATERIALS.

SPECIFICATION forming part of Letters Patent No. 256,476, dated April 18, 1882.

Application filed January 18, 1882. (No model.)

*To all whom it may concern:*

Be it known that I, TIMOTHY GUILFORD, a citizen of the United States, residing in the city, county, and State of New York, have invented certain Improvements in the Manufacture of Buttons and other Articles from Plastic Materials, of which the following is a specification.

This invention relates to the manufacture of buttons, brush-backs, boxes, frames for hand-mirrors, and other articles from plastic materials that may be molded and consolidated by heat and pressure.

The object of my invention is, in the main, to provide an article made from pulverized horn and hoof with a hard water-proof face or covering, the said horn and hoof being pervious to water in some degree. This face or covering I unite to the body or mass homogeneously by heat and pressure. Another object is to enable me to ornament the button or other article by imprinting or marking on the back of the transparent facing a design which will appear through the same and yet be protected against blemish or damage.

The advantage of this construction is that I am enabled to employ a water-proof and hard facing material, as celluloid, or other similar compound of pyroxyline, which is too expensive to be used as the mass of articles of this character. By making the mass of the article from pulverized horn and hoof, and covering this with a film or thin covering of celluloid, I obtain an article having all of the advantages and characteristics of an article made wholly from celluloid, but much cheaper than one made from that material.

In carrying out my invention I first take a thin sheet or film of the celluloid or other compound of pyroxyline, which sheet may be either colored in its mass, made in imitation of tortoise-shell, or made transparent. This facing I lay in the die and upon it place the proper quantity of ground horn or hoof to form the mass of the article. I then submit the mass to heat and pressure in the usual manner, whereby the whole will be found united in one homogeneous mass. The degree of heat employed must be sufficient to soften and render plastic the celluloid facing, so that it will coalesce with the horn or hoof under pressure.

The article thus produced will have a complete facing of celluloid, and will be in all essential respects the same as if made from that material throughout.

In some cases it is desirable that the article shall be entirely covered with the celluloid film. In that case another sheet or film must be laid on the top of the ground horn or hoof in the die and the whole compressed.

When it is desired to display an organized design through the transparent face the facing sheet or film may have painted or printed upon its back the desired design or ornament, employing as pigments gold, silver, or colors which will stand the heat employed in consolidating the mass.

The celluloid employed for the facing sheet or film may be the merchantable article wherein the cellulose has been thoroughly and chemically combined with its solvent; or I may employ the material in its raw state, in which the cellulose is intimately mixed but not chemically combined with its solvent. In this latter case the combination will be effected under the influence of the heat employed in making the article, and the horn and hoof will absorb the moisture or vapors given off by the facing materials.

Figure 2:
Figure 3:
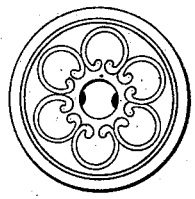
Figure 4:

In the drawings which serve to illustrate my invention, Figure 1 represents the face of a button which has a facing of "tortoise-shell" celluloid, and Fig. 2 is a cross-section of the same. Fig. 3 is a face view of a button having a design printed on the back of the transparent celluloid facing before the latter is applied in the manufacture; and Fig. 4 is a sectional view of a case for a hand-mirror, showing the celluloid facing material extended over the entire surface.

The horn or hoof of which the mass of the article is composed is designated by $a$, and the facing united to form one therewith is designated by $b$.

I am aware that it is not new to merely cover articles—as wooden moldings, for example—with sheets of celluloid; but in these there is of course no union of the two to form one homogeneous mass.

I am also aware that colored or ornamental plates or pieces previously molded have been united to a mass of plastic material by heat and pressure. This has been done for the purpose of ornamenting the faces of articles made from plastic materials. My invention differs from this in that my purpose is to provide the article with a hard water-proof facing of celluloid united homogeneously with the mass in the process of manufacture. I therefore disclaim the method of molding articles from plastic materials which consists in first molding the figures or designs in molds or dies, and then placing the part or parts thus formed in a finishing-mold with the proper amount of stock and uniting the whole into one by pressure, or by heat and pressure combined; and I make no claim to articles thus made.

I claim as my invention—

1. An article—as a button, for example—the mass of which is formed from ground horn or hoof and the face from a thin film of celluloid or other pyroxyline compound, the two being united by heat and pressure to form one homogeneous mass, substantially as set forth.

2. An article—as a button, for example—the mass of which is composed of ground horn or hoof and the face of a thin transparent film of celluloid or other pyroxyline compound having a design on its back, and the two being united by heat and pressure to form one homogeneous mass, as set forth.

In witness whereof I have hereunto signed my name in the presence of two subscribing witnesses.

TIMOTHY GUILFORD.

Witnesses:
HENRY CONNETT,
ARTHUR C. FRASER.